United States Patent
Kuo et al.

(10) Patent No.: US 10,513,215 B1
(45) Date of Patent: Dec. 24, 2019

(54) HEADLAMP ADJUSTMENT SYSTEM AND HEAD LAMP

(71) Applicant: Maxzone Auto Parts Corp., Fontana, CA (US)

(72) Inventors: Tai-Shan Kuo, Tainan (TW); Wen-Han Hsieh, Tainan (TW)

(73) Assignee: MAXZONE AUTO PARTS CORP., Fontana, CA (US)

( * ) Notice: Subject to any disclaimer, the term of this patent is extended or adjusted under 35 U.S.C. 154(b) by 0 days.

(21) Appl. No.: 16/257,201

(22) Filed: Jan. 25, 2019

(30) Foreign Application Priority Data

Sep. 7, 2018 (TW) .............................. 107212298 U

(51) Int. Cl.
| | |
|---|---|
| *F21V 7/00* | (2006.01) |
| *F21V 14/02* | (2006.01) |
| *B60Q 1/068* | (2006.01) |
| *F21S 41/30* | (2018.01) |
| *B60Q 1/072* | (2006.01) |

(52) U.S. Cl.
CPC ........... *B60Q 1/0683* (2013.01); *B60Q 1/072* (2013.01); *F21S 41/30* (2018.01)

(58) Field of Classification Search
CPC .... B60Q 1/068–072; F21S 41/30; F21S 41/39
USPC ................ 362/277–289, 418–430, 514–515, 362/523–532
See application file for complete search history.

(56) References Cited

U.S. PATENT DOCUMENTS 6,206,556 B1  3/2001  Cook

*Primary Examiner* — Jason M Han
(74) *Attorney, Agent, or Firm* — McClure, Qualey & Rodack, LLP

(57) ABSTRACT

A headlamp adjustment system is applied on a head lamp. The head lamp includes a lens cover, a housing and a reflector. The headlamp adjustment system includes a fixing member, a screw member, a jointing member, a flexible shaft member and a mounting assembly. The fixing member is fixedly disposed on the housing and includes a through hole. The through hole is communicated with a through opening of the housing. The screw member includes a front end and a rear end. The front end is passed through the through opening to be connected to the reflector, and the rear end is passed through the through hole to be exposed out of the housing. The jointing member is connected between the screw member and the flexible shaft member. The mounting assembly is restrictedly disposed in the lens cover and connected to the flexible shaft member.

4 Claims, 6 Drawing Sheets

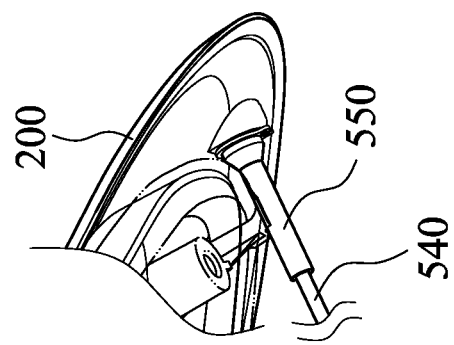
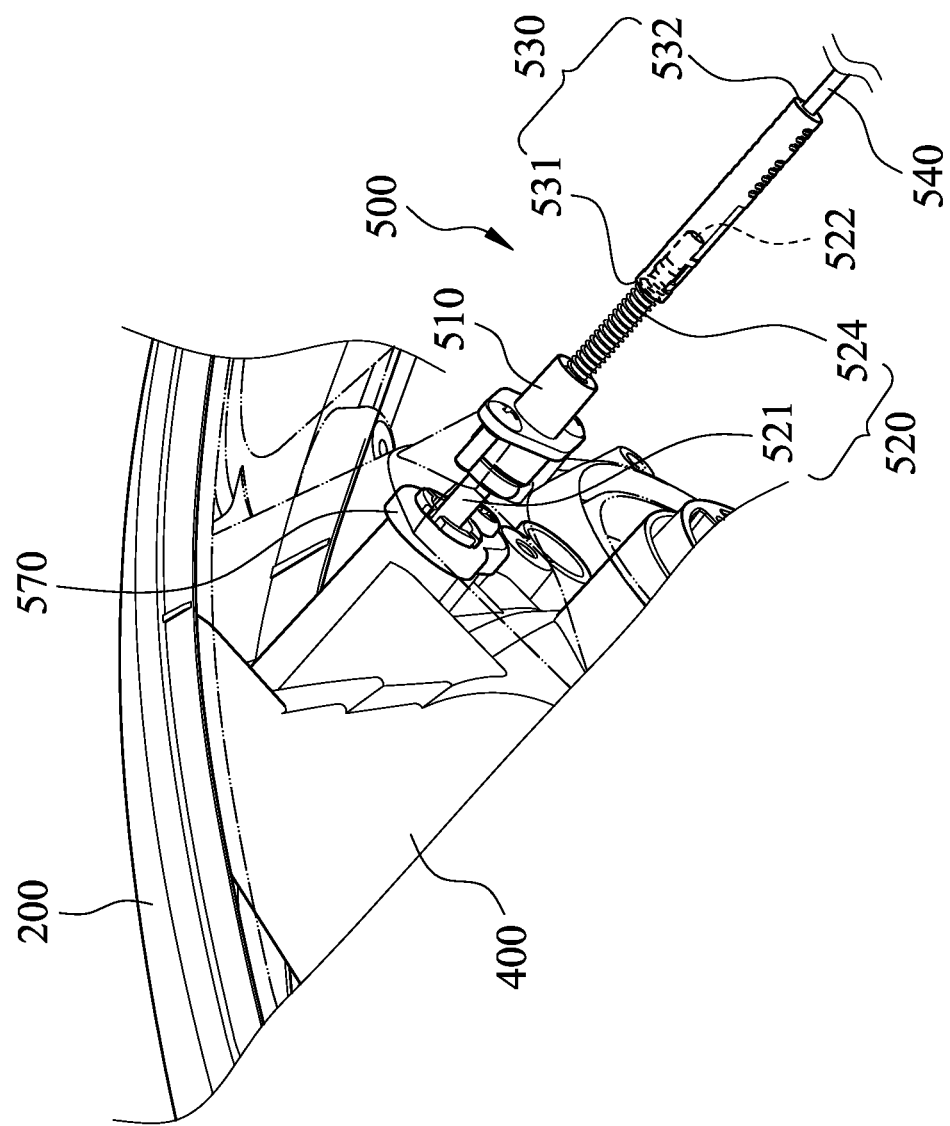
Fig. 3A
Fig. 3B

HEADLAMP ADJUSTMENT SYSTEM AND HEAD LAMP

RELATED APPLICATIONS

This application claims priority to Taiwan Application Serial Number 107212298, filed Sep. 7, 2018, which is herein incorporated by reference.

BACKGROUND

Technical Field

The present disclosure relates to a headlamp adjustment system and a head lamp. More particularly, the present disclosure relates to a headlamp adjustment system and a head lamp which are capable of adjusting a projection angle of the head lamp.

Description of Related Art

Modern people care a lot about driving safety. In order to obtain good illumination in poor visibility conditions, conventional vehicles adapt lamp for providing lights in the night, the raining day or the dark time to increase the driving safety.

A conventional head lamp includes a lens cover, a housing, a light source and a reflector. The light source is disposed in the reflector. The reflector is disposed between the housing and the lens cover. A light generated by the light source is emitted toward the lens cover to provide illumination.

Due to manufacturing or installation errors, it is easy to cause changes in the projection angle of the head lamp, thereby affecting illumination. Therefore, a conventional headlamp adjustment system is proposed. The conventional headlamp adjustment system includes a screw member, a jointing member and a flexible shaft member. The screw member is passed through the housing to be connected to the reflector. The jointing member is connected between the screw member and the flexible shaft member. The flexible shaft member is fixedly disposed on a clamping portion of the housing. The lens cover includes an opening for conveniently installing the flexible shaft member from an outside of the lens cover. The conventional headlamp adjustment system can adjust an angle of the reflector by controlling the flexible shaft member to rotate the jointing member and the screw member. However, the conventional headlamp adjustment system needs to dispose the clamping portion on the housing, thereby forming a complex structure and a complex process and increasing manufacturing costs.

Therefore, how to develop a headlamp adjustment system which is complied with the regulation base on the ground of simplified structure, simplified process and low manufacturing cost becomes a pursue target for the practitioners.

SUMMARY

According to one aspect of the present disclosure, a headlamp adjustment system is applied on a head lamp. The head lamp includes a lens cover, a housing and a reflector disposed between the lens cover and the housing. The headlamp adjustment system includes a fixing member, a screw member, a jointing member, a flexible shaft member and a mounting assembly. The fixing member is fixedly disposed on the housing and includes a through hole. The through hole is communicated with a through opening of the housing. The screw member includes a front end and a rear end. The front end is passed through the through opening of the housing to be connected to the reflector, and the rear end is passed through the through hole of the fixing member to be exposed out of the housing. The jointing member includes a proximal end and a distal end. The proximal end is connected to the rear end of the screw member. The flexible shaft member includes a first end and a second end. The first end is connected to the distal end of the jointing member. The mounting assembly is restrictedly disposed in an opening of the lens cover and connected to the second end of the flexible shaft member. The mounting assembly includes a bolt member and a buckle ring. The bolt member includes a head portion and a rod portion. The head portion includes a ring groove. The rod portion is connected to the head portion. The buckle ring is configured to clamp the ring groove. When the mounting assembly is restrictedly disposed in the opening of the lens cover, the head portion is limited by the opening. The rod portion is exposed out of the opening and connected to the second end of the flexible shaft member. The ring groove is exposed out of the opening to be clamped by the buckle ring, and the head portion is fixedly disposed in the opening.

According to another aspect of the present disclosure, a head lamp includes a lens cover, a housing, a reflector and a headlamp adjustment system. The lens cover includes an opening. The housing is connected to the lens cover and includes a through opening. The reflector is disposed between the lens cover and the housing. The headlamp adjustment system includes a fixing member, a screw member, a jointing member, a flexible shaft member and a mounting assembly. The fixing member is fixedly disposed on the housing and includes a through hole. The through hole is communicated with the through opening. The screw member includes a front end and a rear end. The front end is passed through the through opening of the housing to be connected to the reflector, and the rear end is passed through the through hole of the fixing member to be exposed out of the housing. The jointing member includes a proximal end and a distal end. The proximal end is connected to the rear end of the screw member. The flexible shaft member includes a first end and a second end. The first end is connected to the distal end of the jointing member. The mounting assembly is restrictedly disposed in the opening of the lens cover and connected to the second end of the flexible shaft member. The mounting assembly includes a bolt member and a buckle ring. The bolt member includes a head portion and a rod portion. The head portion includes a ring groove. The rod portion is connected to the head portion. The buckle ring is configured to clamp the ring groove. When the mounting assembly is restrictedly disposed in the opening of the lens cover, the head portion is limited by the opening. The rod portion is exposed out of the opening and connected to the second end of the flexible shaft member. The ring groove is exposed out of the opening to be clamped by the buckle ring, and the head portion is fixedly disposed in the opening.

BRIEF DESCRIPTION OF THE DRAWINGS

The present disclosure can be more fully understood by reading the following detailed description of the embodiment, with reference made to the accompanying drawings as follows:

FIG. 3A shows a schematic enlarged view of one portion of the head lamp of FIG. 1.

FIG. 3B shows a schematic enlarged view of another portion of the head lamp of FIG. 1.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or module) is referred to as be "disposed on" or "connected to" another element, it can be directly disposed on or connected to the other element, or it can be indirectly disposed on or connected to the other element, that is, intervening elements may be present. In contrast, when an element is referred to as be "directly disposed on" or "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
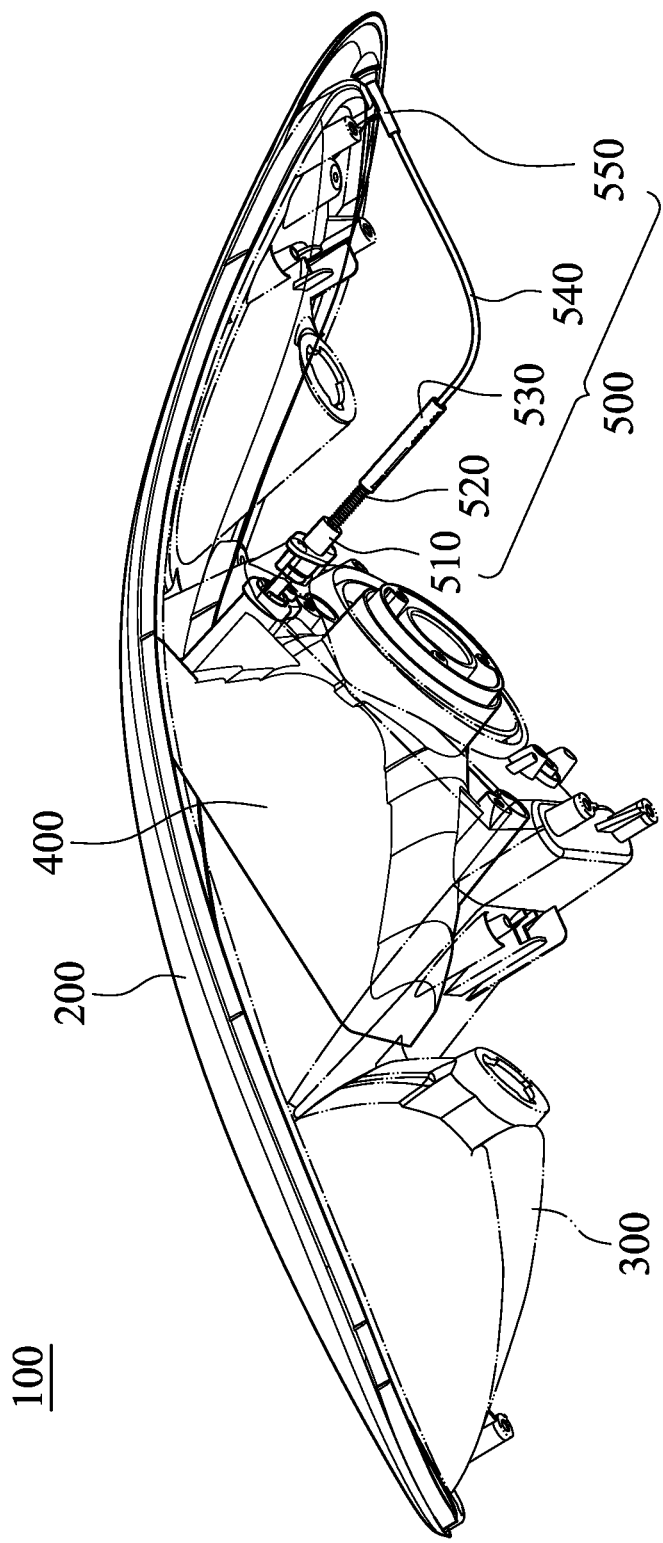
FIG. 1 shows a schematic view of a head lamp according to one embodiment of the present disclosure.
Figure 2:
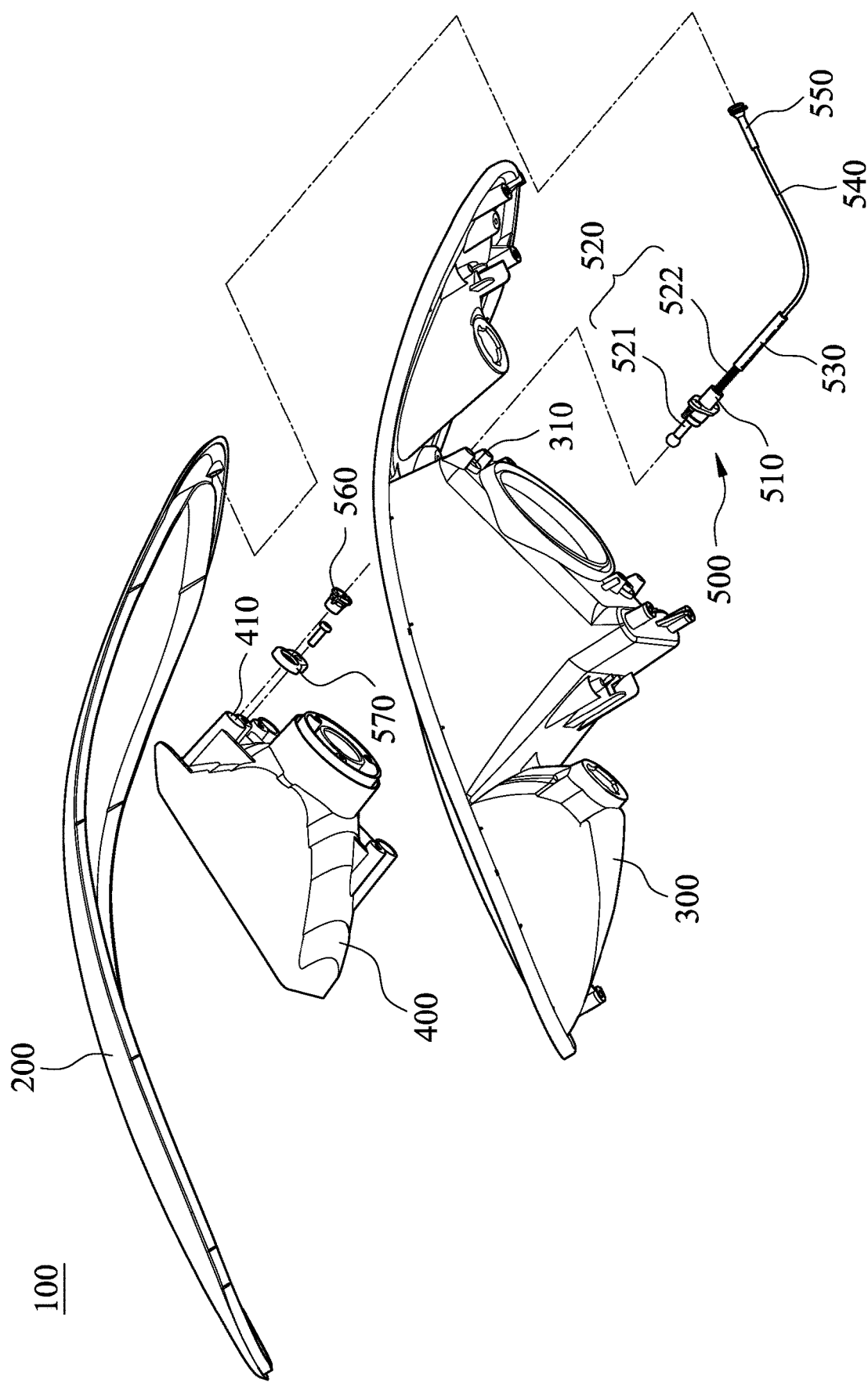
FIG. 2 shows an exploded view of the head lamp of FIG. 1.
Figure 4:
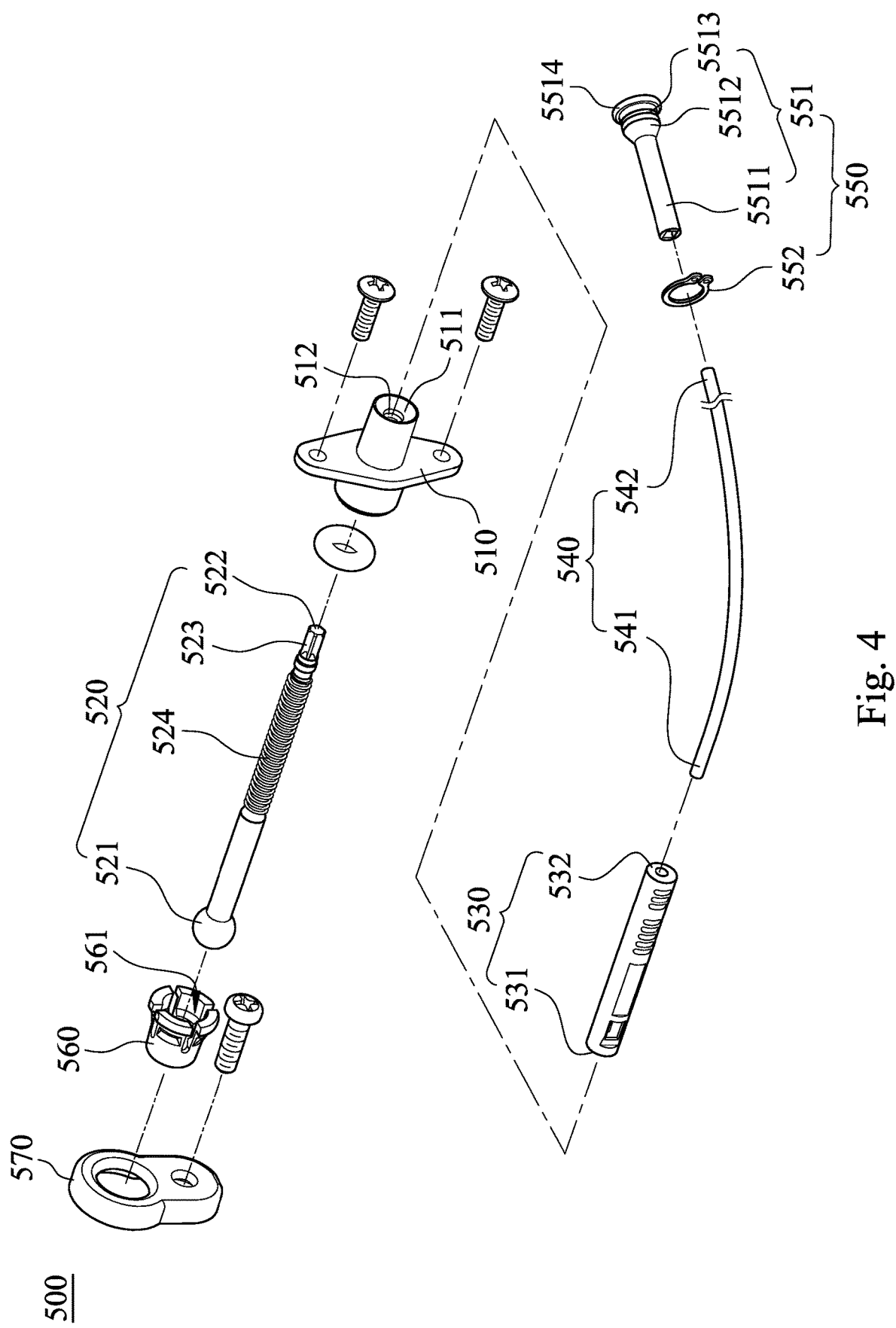
FIG. 4 shows an exploded view of a headlamp adjustment system of the head lamp of FIG. 1.
Figure 5:
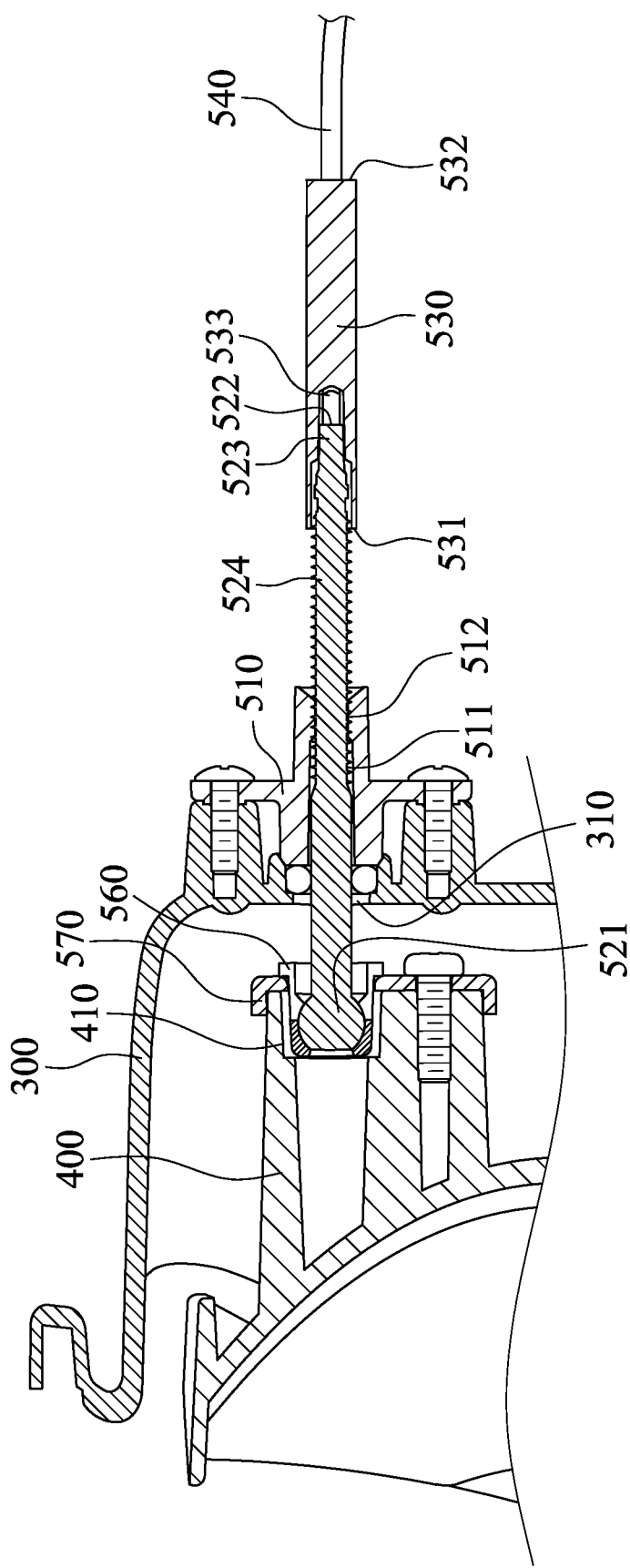
FIG. 5 shows a cross-sectional view of one part of the head lamp of FIG. 1.
Figure 6:
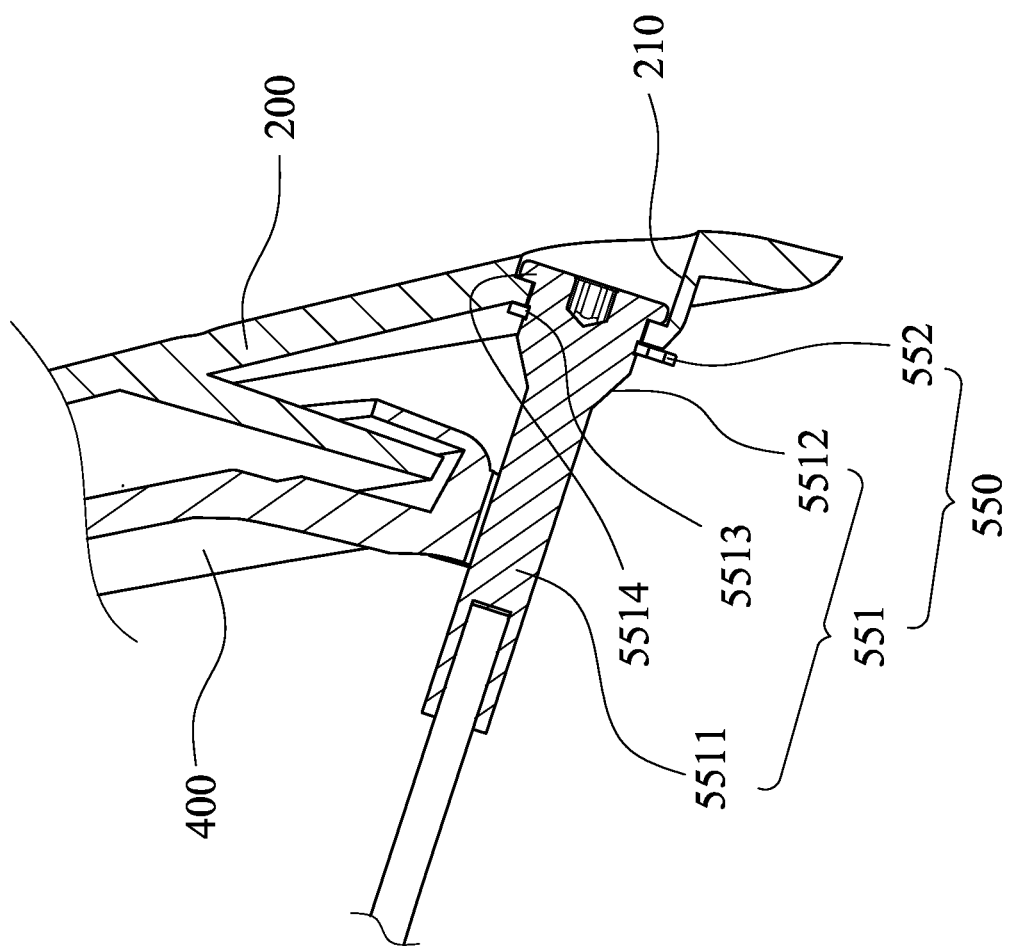
FIG. 6 shows a cross-sectional view of another part of the head lamp of FIG. 1.

FIG. 1 shows a schematic view of a head lamp 100 according to one embodiment of the present disclosure. FIG. 2 shows an exploded view of the head lamp 100 of FIG. 1. FIG. 3A shows a schematic enlarged view of one portion of the head lamp 100 of FIG. 1. FIG. 3B shows a schematic enlarged view of another portion of the head lamp 100 of FIG. 1. FIG. 4 shows an exploded view of a headlamp adjustment system 500 of the head lamp 100 of FIG. 1. FIG. 5 shows a cross-sectional view of one part of the head lamp 100 of FIG. 1. FIG. 6 shows a cross-sectional view of another part of the head lamp 100 of FIG. 1. The head lamp 100 includes a lens cover 200, a housing 300, a reflector 400 and a headlamp adjustment system 500.

The lens cover 200 includes an opening 210. The housing 300 is connected to the lens cover 200 and includes a through opening 310. The reflector 400 is disposed between the lens cover 200 and the housing 300. The headlamp adjustment system 500 includes a fixing member 510, a screw member 520, a jointing member 530, a flexible shaft member 540 and a mounting assembly 550. The fixing member 510 is fixedly disposed on the housing 300 and includes a through hole 511. The through hole 511 is communicated with the through opening 310. The screw member 520 includes a front end 521 and a rear end 522. The front end 521 is passed through the through opening 310 of the housing 300 to be connected to the reflector 400, and the rear end 522 is passed through the through hole 511 of the fixing member 510 to be exposed out of the housing 300. The jointing member 530 includes a proximal end 531 and a distal end 532. The proximal end 531 is connected to the rear end 522 of the screw member 520. The flexible shaft member 540 includes a first end 541 and a second end 542. The first end 541 is connected to the distal end 532 of the jointing member 530. The mounting assembly 550 is restrictedly disposed in the opening 210 of the lens cover 200 and connected to the second end 542 of the flexible shaft member 540.

Therefore, the headlamp adjustment system 500 can be fixedly connected to the opening 210 of the lens cover 200 via the mounting assembly 550 without a conventional clamping portion disposed on the housing 300. The head lamp 100 will be described in detail in the following paragraphs.

A light source (not shown) may be disposed in the reflector 400 and generate a light. A part of the light is directly emitted toward the lens cover 200. Another part of the light is reflected by the reflector 400 and then emitted toward the lens cover 200.

The headlamp adjustment system 500 can be used to adjust an angle of the reflector 400. The fixing member 510 may be screwed to the housing 300 via a bolt (no labeled). When the fixing member 510 is screwed to the housing 300, the through hole 511 is communicated with the through opening 310 of the housing 300. When the screw member 520 is inserted into the through hole 511 of the fixing member 510 and the through opening 310 of the housing 300, the front end 521 of the screw member 520 is exposed out of the housing 300 and faced toward a side of the reflector 400 so as to be connected to the reflector 400. The rear end 522 of the screw member 520 is exposed out of the housing 300 and faced away from the side of the reflector 400 so as to be connected to the jointing member 530. The screw member 520 further includes an external thread 524. The fixing member 510 further includes an internal thread 512 located on an inner wall of the through hole 511. The external thread 524 is screwed to the internal thread 512, so that the screw member 520 can be threadedly connected to the fixing member 510.

The screw member 520 further includes an engaging portion 523 located at the rear end 522 of the screw member 520. The jointing member 530 further includes an engaging groove 533 located at the proximal end 531 of the jointing member 530 and engaged with the engaging portion 523. In detail, the engaging portion 523 has a convex tooth structure. The engaging groove 533 has a concave tooth structure corresponding to the convex tooth structure so as to be engaged with the engaging portion 523. Accordingly, the screw member 520 can be rotated synchronously with the jointing member 530.

The flexible shaft member 540 has a long tubular structure and can be bent. When a user wants to adjust the angle of the reflector 400, the flexible shaft member 540 can be operated by a tool to rotate the jointing member 530 and the screw member 520. Due to a threaded connection between the fixing member 510 and the screw member 520, the screw member 520 may be axially moved to adjust the angle of the reflector 400.

In addition, in FIGS. 1, 2, 3A, 3B, 4, 5 and 6, the reflector 400 includes a hole 410. The headlamp adjustment system 500 can further include a universal joint 560 and an engaging seat 570. The engaging seat 570 is fixedly disposed around the hole 410 of the reflector 400 and engaged with the universal joint 560. The universal joint 560 includes an accommodating hole 561. The front end 521 of the screw member 520 has a spherical structure and is accommodated in the accommodating hole 561, so that the angle of the reflector 400 can be adjusted favorably. When installing the headlamp adjustment system 500 onto the housing 300 and the reflector 400, the front end 521 of the screw member 520 is first passed through the through opening 310 of the housing 300. Then, the universal joint 560 is disposed outside of the front end 521 of the screw member 520, and the universal joint 560 combined with the front end 521 of the screw member 520 is engaged with the engaging seat 570 previously disposed around the hole 410 of the reflector 400. The headlamp adjustment system 500 can further include a gasket (not labeled). The gasket is disposed around the through opening 310 of the housing 300 so as to be abutted against the fixing member 510.

The mounting assembly 550 may include a bolt member 551. The bolt member 551 includes a head portion 5512 and a rod portion 5511. The rod portion 5511 is connected to the head portion 5512. When the mounting assembly 550 is restrictedly disposed in the opening 210 of the lens cover 200, the head portion 5512 is limited by the opening 210. The rod portion 5511 is exposed out of the opening 210 and connected to the second end 542 of the flexible shaft member 540. In detail, the head portion 5512 further includes a flange 5514, and the opening 210 of the lens cover 200 includes an abutting portion (not labeled). The flange 5514 is abutted against the abutting portion of the opening 210, so that the head portion 5512 may be limited by the opening 210, as shown in FIG. 6.

Moreover, the mounting assembly 550 may further include a buckle ring 552. The head portion 5512 of the bolt member 551 includes a ring groove 5513. The buckle ring 552 is configured to clamp the ring groove 5513. When the head portion 5512 is limited by the opening 210 of the lens cover 200, the ring groove 5513 is exposed out of the opening 210 to be clamped by the buckle ring 552, and the head portion 5512 is fixedly disposed in the opening 210. The buckle ring 552 may have a C-ring structure. When the ring groove 5513 is clamped by the buckle ring 552, the bolt member 551 can be stably connected to the opening 210 without protruding from the lens cover 200 so as to improve beautiful effects.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A headlamp adjustment system, which is applied on a head lamp, the head lamp comprising a lens cover, a housing and a reflector disposed between the lens cover and the housing, and the headlamp adjustment system comprising:
a fixing member fixedly disposed on the housing and comprising a through hole, wherein the through hole is communicated with a through opening of the housing;
a screw member comprising a front end and a rear end, wherein the front end is passed through the through opening of the housing to be connected to the reflector, and the rear end is passed through the through hole of the fixing member to be exposed out of the housing;
a jointing member comprising a proximal end and a distal end, wherein the proximal end is connected to the rear end of the screw member;

a flexible shaft member comprising a first end and a second end, wherein the first end is connected to the distal end of the jointing member; and
a mounting assembly restrictedly disposed in an opening of the lens cover and connected to the second end of the flexible shaft member, and the mounting assembly comprising:
a bolt member comprising:
a head portion comprising a ring groove; and
a rod portion connected to the head portion; and
a buckle ring configured to clamp the ring groove;
wherein when the mounting assembly is restrictedly disposed in the opening of the lens cover, the head portion is limited by the opening, the rod portion is exposed out of the opening and connected to the second end of the flexible shaft member, the ring groove is exposed out of the opening to be clamped by the buckle ring, and the head portion is fixedly disposed in the opening.

2. The headlamp adjustment system of claim 1, wherein,
the screw member further comprises an engaging portion located at the rear end of the screw member; and
the jointing member further comprises an engaging groove located at the proximal end of the jointing member and engaged with the engaging portion.

3. A head lamp, comprising:
a lens cover comprising an opening;
a housing connected to the lens cover and comprising a through opening;
a reflector disposed between the lens cover and the housing; and
a headlamp adjustment system comprising:
a fixing member fixedly disposed on the housing and comprising a through hole, wherein the through hole is communicated with the through opening;
a screw member comprising a front end and a rear end, wherein the front end is passed through the through opening of the housing to be connected to the reflector, and the rear end is passed through the through hole of the fixing member to be exposed out of the housing;
a jointing member comprising a proximal end and a distal end, wherein the proximal end is connected to the rear end of the screw member;
a flexible shaft member comprising a first end and a second end, wherein the first end is connected to the distal end of the jointing member; and
a mounting assembly restrictedly disposed in the opening of the lens cover and connected to the second end of the flexible shaft member, and the mounting assembly comprising:
a bolt member comprising:
a head portion comprising a ring groove; and
a rod portion connected to the head portion; and
a buckle ring configured to clamp the ring groove;
wherein when the mounting assembly is restrictedly disposed in the opening of the lens cover, the head portion is limited by the opening, the rod portion is exposed out of the opening and connected to the second end of the flexible shaft member, the ring groove is exposed out of the opening to be clamped by the buckle ring, and the head portion is fixedly disposed in the opening.

4. The head lamp of claim 3, wherein,
the screw member further comprises an engaging portion located at the rear end of the screw member; and the jointing member further comprises an engaging groove located at the proximal end of the jointing member and engaged with the engaging portion.

* * * * *